(12) United States Patent
Cowelchuk et al.

(10) Patent No.: US 7,291,378 B2
(45) Date of Patent: Nov. 6, 2007

(54) TRIM PANEL ASSEMBLY HAVING INTEGRATED ENERGY MANAGEMENT CHARACTERISTICS AND METHOD OF MANUFACTURE

(75) Inventors: Glenn A. Cowelchuk, Chesterfield Township, MI (US); Randy S. Reed, Fair Haven, MI (US); Michael P. Schoemann, Waterford, MI (US); John D. Youngs, Southgate, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 330 days.

(21) Appl. No.: 10/852,056

(22) Filed: May 24, 2004

(65) Prior Publication Data

US 2005/0260385 A1 Nov. 24, 2005

(51) Int. Cl.
*B32B 3/24* (2006.01)
(52) U.S. Cl. .................. 428/140; 428/139; 296/146.7; 280/748; 280/751; 264/273
(58) Field of Classification Search ................. 428/139, 428/140; 296/146.7; 280/748, 751; 264/273
See application file for complete search history.

(56) References Cited

U.S. PATENT DOCUMENTS

| | | | |
|---|---|---|---|
| 4,822,671 A * | 4/1989 | Carper et al. ................. 428/33 |
| 5,925,435 A | 7/1999 | Togawa et al. | |
| 5,934,737 A | 8/1999 | Abouzahr | |
| 6,036,251 A | 3/2000 | Yagishita et al. | |
| 6,080,463 A | 6/2000 | Togawa et al. | |
| 6,296,796 B1 | 10/2001 | Gordon | |
| 6,352,427 B1 | 3/2002 | Hahn et al. | |
| 7,008,584 B2 * | 3/2006 | Inoue et al. ................. 264/154 |
| 2002/0094414 A1* | 7/2002 | Wagenblast et al. ........ 428/139 |
| 2003/0090035 A1 | 5/2003 | Mori et al. | |
| 2004/0247828 A1* | 12/2004 | Brozenick et al. .......... 428/139 |
| 2005/0042421 A1* | 2/2005 | Schwarzwalder et al. ... 428/137 |

* cited by examiner

*Primary Examiner*—William P Watkins, III
(74) *Attorney, Agent, or Firm*—Brooks Kushman P.C.

(57) ABSTRACT

The present invention relates to a trim panel assembly for a vehicle having integrated energy management characteristics and method of manufacture. The trim panel assembly comprises a panel made of a first material having a first panel surface and a second panel surface, a skin covering at least a portion of the first panel surface of the panel, with the skin being made of a second material less rigid then the first material, and a rib depending from the second panel surface away from the skin. The rib has at least a first portion being made of the second material.

20 Claims, 3 Drawing Sheets

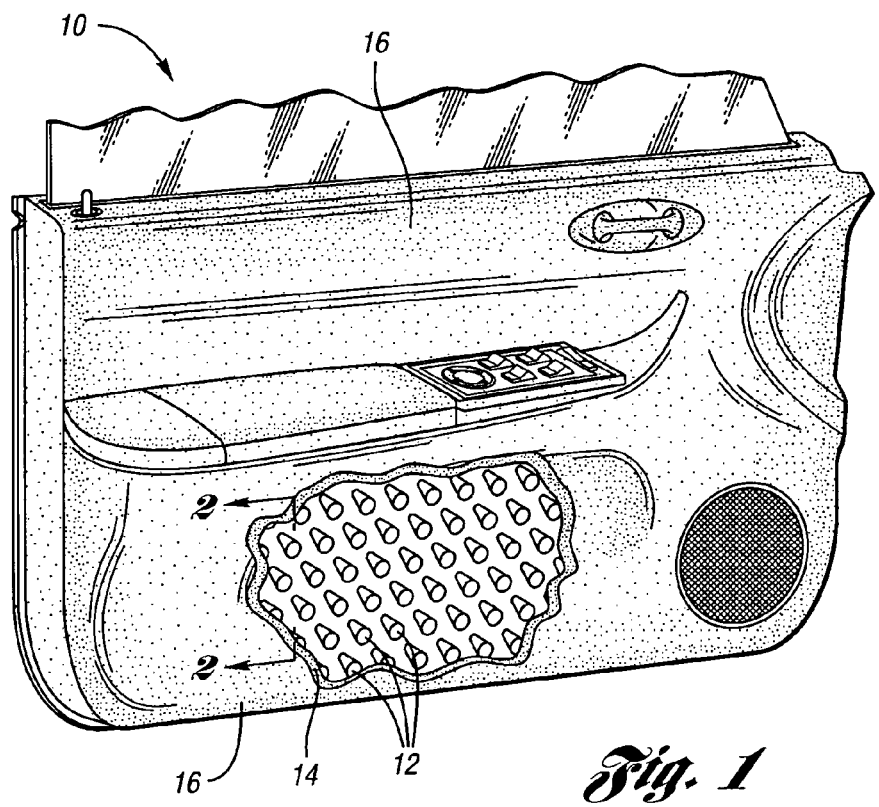
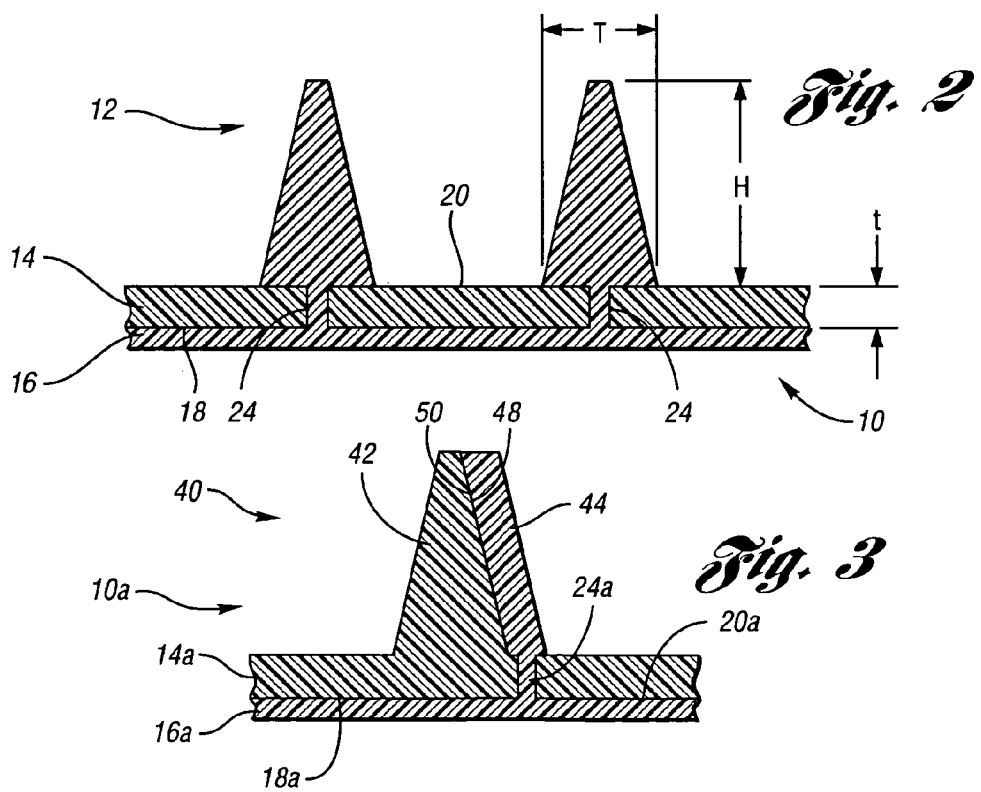

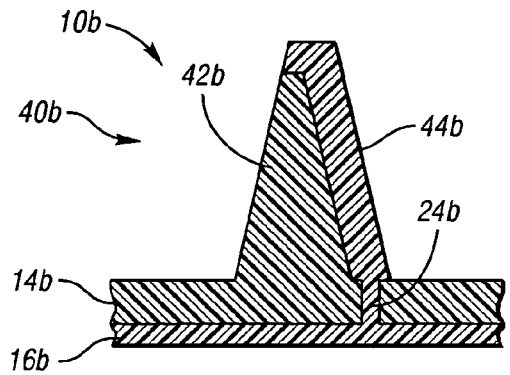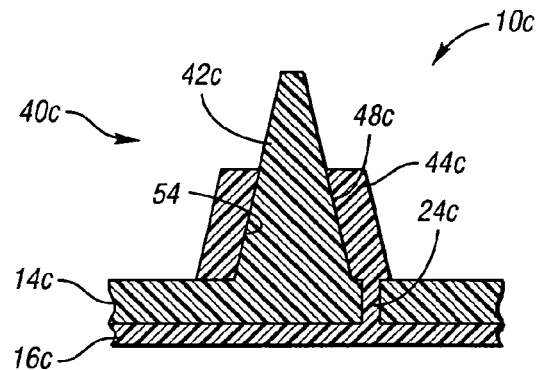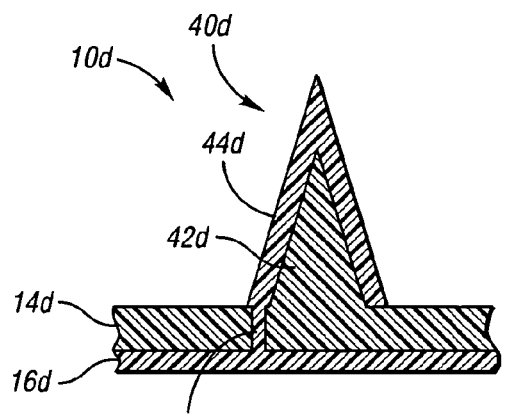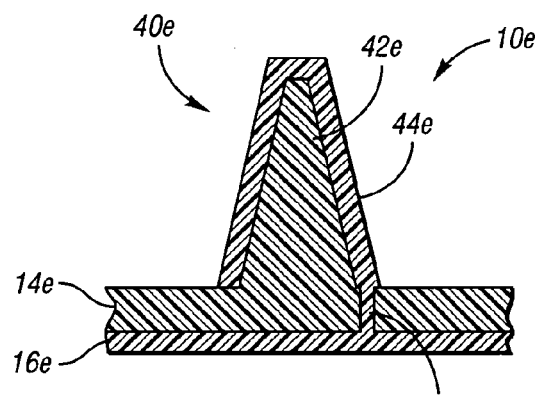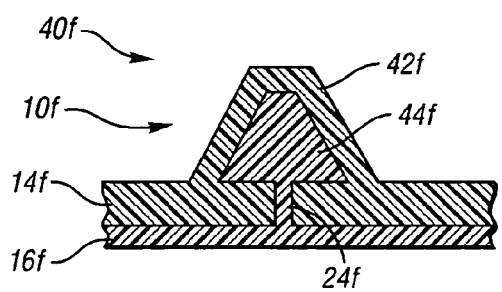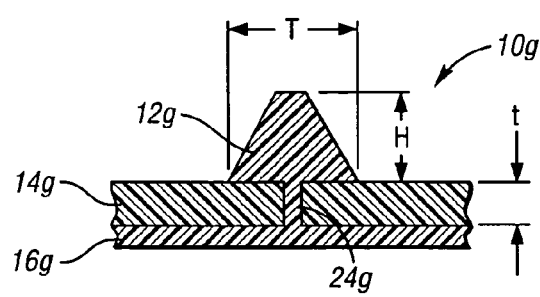

TRIM PANEL ASSEMBLY HAVING INTEGRATED ENERGY MANAGEMENT CHARACTERISTICS AND METHOD OF MANUFACTURE

BACKGROUND OF THE INVENTION

1. Field of the Invention

The present invention relates to a trim panel assembly having integrated energy management characteristics and a method of manufacturing the same.

2. Background Art

Vehicle trim panels such as interior door panels, instrument panels, knee bolsters, among others, typically comprise a rigid retainer or substrate panel and a thin elastic plastic skin covering the panel. The trim panel may include energy management structure. An example of one such structure is a rib or plurality of ribs on the interior of the panel that is designed to crumple upon impact of the trim panel.

One current technique for providing the desired ribs is to secure separate, preformed, ribs to a preformed substrate. This requires additional parts (the ribs) and additional complexity to the manufacturing process.

Another technique is to mold ribs onto the back surface of the substrate during the substrate molding step. In this case, the substrate and rib are made of the same rigid material. The rigidity of the rib tends to lessens the energy management function of the rib. Furthermore, these ribs, because of their ability to cause depressions on the A-surface of the trim panel, must have a width less than 80% of the average thickness of the panel. While the width of these ribs must be closely controlled for aesthetics, the length of the ribs may be relatively much longer to allow the necessary energy management characteristics to be achieved.

However, due to the inherent limited space availability in a vehicle interior, there is always a desire to minimize space usage within a vehicle interior. Furthermore, there is always an incentive to reduce cost of the vehicle parts and manufacturing complexities.

Accordingly, it would be desirable to provide a trim panel having energy management characteristics that can provide an improvement over the at least one aspect of the prior art.

SUMMARY OF THE INVENTION

In at least one embodiment, the present invention relates to a trim panel assembly for a vehicle. The trim panel assembly comprises a panel made of a first material. The panel has a first panel surface and a second panel surface. The assembly further comprises a skin covering at least a portion of the first panel surface of the panel. The skin is made of a second material. The second material is less rigid than the first material. The trim panel assembly further comprises a rib depending from the second panel surface away from the skin. The rib has at least a first portion that is made of the second material.

In certain embodiments, an extension portion extends between and connects the skin and the rib. In these embodiments, the extension portion is made of the second material.

In certain other embodiments, a second rib extends from the back surface of the panel. In these embodiments, the second rib may be made of the first material.

In certain embodiments, the trim panel assembly is made in a two-shot molding process wherein the first material is injection molded in the first shot and then the second material is injection molded in the second shot after the first shot.

In certain embodiments, substantially all of the rib may be made of the second material.

In certain other embodiments, the trim panel assembly comprises a panel made of a first material having a first surface, a second surface, and an average thickness, a skin covering at least a portion of the first surface of the panel, with skin being made of a second material which is less rigid than the first material, and a rib extending from the back surface of the panel, with the rib having an average width of at least 80% of the average thickness of the panel.

In certain embodiments, the average width of the rib is between 0.80 and 3.0 times the average thickness of the panel.

In yet certain other embodiments, the present invention relates to a method for manufacturing a trim panel assembly for a vehicle. The method comprises providing a panel made of a first material, with the panel having a first panel surface and a second panel surface, providing a skin covering at least a portion of the first panel surface of the panel, with the skin being made of a second material less rigid then the first material, and providing a rib depending from the second panel surface away from the skin, with the rib having at least a first portion being made of the second material.

In certain embodiments, the first portion of the rib and the skin are formed during the same injection molding process.

In certain embodiments, an extension portion made of the second material that extends between and connects the skin and the first portion of the rib.

In certain embodiments, the panel includes a channel wherein the extension portion is to be provided.

BRIEF DESCRIPTION OF THE DRAWINGS

FIG. 1 is a perspective view of a trim panel assembly made in accordance with the first embodiment of the present invention;

FIG. 2 is a view taken along lines 2-2 of FIG. 1;

FIG. 3 is a sectional view of a trim panel assembly made in accordance with a second embodiment of the present invention;

FIG. 4 is a sectional view of a trim panel assembly made in accordance with a third embodiment of the present invention;

FIG. 5 is a sectional view of a trim panel assembly made in accordance with a fourth embodiment of the present invention;

FIG. 6 is a sectional view of a trim panel assembly made in accordance with a fifth embodiment of the present invention;

FIG. 7 is a sectional view of a trim panel assembly made in accordance with a sixth embodiment of the present invention;

FIG. 8 is a sectional view of a trim panel assembly made in accordance with a seventh embodiment of the present invention;

FIG. 9 is a sectional view of a trim panel assembly made in accordance with a eighth embodiment of the present invention;

DETAILED DESCRIPTION OF THE PREFERRED EMBODIMENT(S)

Figure 10:
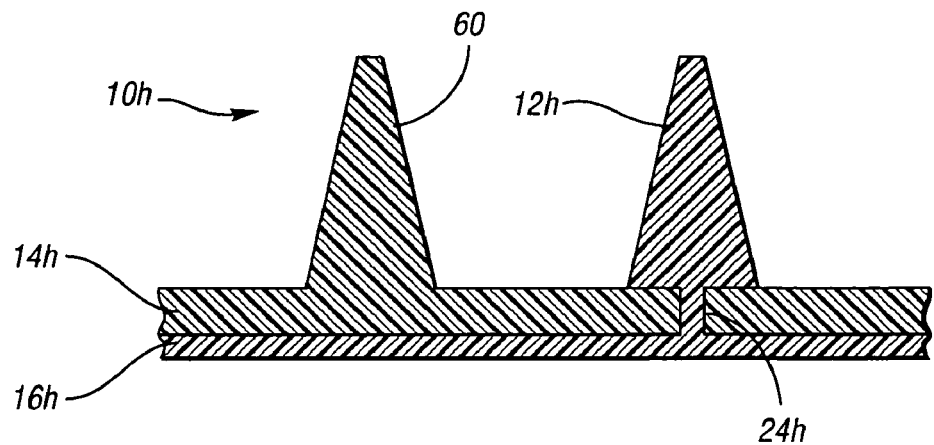
FIG. 10 sectional view of a trim panel assembly made in accordance with a ninth embodiment of the present invention.

As required, detailed embodiments of the present invention are disclosed herein. However, it is to be understood that disclosed embodiments are merely exemplary of the invention that may be embodied in various alternative forms. The figures are not necessarily to scale, some figures may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in this description and in the claims indicating amounts or conditions are to be understood as modified by the word "about" in describing the broader scope of the invention. Practice within the numerical limit stated is generally preferred. Also, unless expressly stated to the contrary, percent, "parts of," and ratio values are by weight and the description of a group or class of materials as suitable or preferred for a given purpose in connection with the invention implies that mixtures of two or more members of the group or class may be equally suitable or preferred.

Referring now to FIGS. 1 and 2, there is illustrated a motor vehicle trim panel 10, such as a door panel. While the trim panel 10 is being illustrated as a door panel, it should be understood that the panel could be other types of trim panels such as vehicle trim panels, such as instrument panels, air bag doors, and knee bolsters. The panel 10 comprises a plurality of integrally formed ribs 12. The panel 10 includes a substrate 14 which provides structural support for the panel 10 and a relatively thin, soft, elastic plastic shell or skin 16 that covers at least portion of a first surface 18 of the substrate. The ribs 12 extend from a back surface 20 of the substrate 14, away from the skin 16.

The substrate 14 is made of a relatively rigid material, such as polypropylene, polyethylene, TPO, PC (Polycarbonate), PC/ABS, ABS and SMA. In certain embodiments, the substrate 14 may have an average thickness of 1.5-4.0 mm, in other embodiments of 1.75-3.25 mm, and in yet other embodiments of 2.0-2.5 mm. The skin 16 is made of a material that is less rigid than the material that is used to make the substrate 14. Examples of suitable materials for the skin 16 include, but are not necessarily limited to, TPE (thermal plastic elastomer), TEE (thermal plastic elastomer-ether-ester), EPDM (ethylene-propylene-butadiene polymer), and other suitable elastomers.

As best shown in FIG. 2, an extension portion 24 extends between and connects the skin 16 with the ribs 12. The skin 16, ribs 12 and extension portion 24 are all made of the same material (i.e., an elastomeric material) and, as will be explained later in greater detail, are all formed during the same injection molding shot, i.e. the second shot of a two-shot injection molding process.

Each of the ribs 12 may have a similar type of shape. That is, the ribs 12 may have an elongated triangular, or frusto-conical, shape that depends or extend from the back surface 26 of the substrate 14. It should be understood that all of the ribs 12 could have a different shape, such as cylindrical, elliptical, and rectangular, or the ribs 12 could have a mixture of shapes, such as triangular and cylindrical shaped ribs. The selection of the shape of the ribs could be varied as desired to achieve a desired energy management characteristic for the panel 10.

The location of the ribs 12 is typically determined to be a location that is most likely to receive the load when a vehicle occupant makes contact with the panel 10 during a collision. As shown on the exemplary door panel 10 in FIG. 1, the ribs 12 are positioned at a location corresponding to the waist and leg of a vehicle occupant.

In at least one embodiment, the ribs 12 may have an average height (H) of 1-100 mm, in other embodiments of 5-50 mm, and yet other embodiments of 10-20 mm. In most embodiments, the average base thickness (T) of the ribs 12 is 0.4-0.8 t. As such, in at least one embodiment, the ribs 12 may have an average base thickness (T) of 0.6-3.2 mm, in other embodiments of 0.7-2.6 mm and in yet other embodiments 0.8-2.0 mm. Because the rib 12 can be made of a relatively non-rigid material and the A-surface of the panel 10 is also made of a relatively non-rigid material, i.e., the skin 16, the base thickness T of the ribs 12 can be greater than those attained in the prior art. In these instances, the average base thickness (T) of the ribs 12 can be 0.3-3.0 t (with t being the average thickness of the substrate 14), and in other embodiments 0.4-2.0 t, in other embodiments 0.8-3.0 t, and still in yet other embodiments 0.85-2.5 t, and still yet in other embodiments 1.0-2.0 t.

The skin 16 and the ribs 12, as well as the extension portion 24, are made during the same step i.e. the second shot, of a two-shot injection molding process. A single method using a multi-shot or two-shot injection molding process will now be described. Such a process is generally described in U.S. Pat. No. 6,756,004, assigned to Lear Corporation, and is incorporated by reference herein in its entirety. This process allows the manufacture of the crumple ribs 12 to be integrated with the manufacture of the skin 16 thereby improving quality, reducing manufacturing complexity and reducing cost. Furthermore, this allows the ribs 12 to be made shorter, if desired, than prior art ribs to thereby conserve vehicle interior compartment space. Additionally, this process allows the trim panels to be made lighter than prior art trim panels thereby reducing cost.

In a two-shot injection molding process, a first type material is injected into an injection molding mold to form the substrate 14. Then, a second type of material is injected into the injection molding mold to form the skin 16, the ribs 12, and the extension portions 24. The mold may include one or more cams or slides that are actuated to create relief cavities into which the second material flows. Alternatively, different mold cavities may be employed for the first and second shots. For instance, a portion of the mold having a material from the first shot may be indexed to a second position and made into another mold portion having appropriate relief cavities before injecting the second type of material. The process may include the following steps. First, a two-shot injection mold is provided. Second a first type of material is injected into the mold via rudders to form the substrate 14. Third, a cam is actuated or the mold is indexed to create one or more relief cavities in the mold for channels in the substrate 14 (that ultimately will house the extension portions 24) to be formed. Fourth, a second type of material is injected into the mold so to simultaneously form the extension portions 24 along with the skin 16 and the ribs 12. The assembly is removed from mold and may be attached to the vehicle.

Alternatively, the process may include the following steps. First a two-shot injection mold is provided. Second, the substrate 14 is formed. While being formed, at least one opening is formed in the substrate that will later be filled with the second material to form the extension portion 24. Third, a mold is reconfigured over the substrate 14 to provide a first cavity adjacent the first surface 18 of the substrate 14 in the shape of the skin 16 while at least a second cavity is formed adjacent the second surface 20 of the substrate 14 in the shape of at least one rib 12. The second cavity and the first cavity are in fluid communication via the opening in substrate 14 where the at least one extension portion 24 will be formed. Then the second type of material is injected into the mold to simultaneously form the skin 16 in a first mold cavity, the at least one rib 12 in the at least one second mold cavity, and the extension portion 24 extending between and connecting the at least one rib 12 and the skin 16. After both shots have been completed, the assembly 10 is removed from the mold and may be attached to the vehicle.

The multi-shot or two-shot molding process permits ribs 12 to be formed with the skin 16. Integral formation eliminates the expense associated with purchasing, maintaining, and operating separate production lines for ribs 12. In addition, improper assembly of ribs 12 is avoided since the assembly steps are eliminated. Furthermore, the quality of the crumple ribs 12 are improved since the ribs to be made of a relatively non-rigid material. Additionally, the size and shape of the ribs can be varied in a relatively robust and simple manner. Furthermore, the amount of material injected can easily be controlled to help reduce waste.

FIG. 3 shows a second embodiment of the trim panel 10a. The second embodiment is similar to the first embodiment illustrated in FIGS. 1-2. Accordingly, parts that are the same or similar will be given the same reference numeral with the suffix "a" attached. In this embodiment, a composite rib 40 comprising a first, relatively hard portion 42 and a second, relatively less rigid portion 44 is formed on the back surface 20a of the substrate 14a. The first surface 18a of the substrate 14a is covered at least in part by the skin 16a. The skin 16a is connected with the second portion 44 of the composite rib 40 via the extension portion 24a. The first portion 42 is formed of the same material, and during the same injection molding step, as substrate 14a. The second portion 44 is formed of the same material, and during the same injection molding step, as skin 16a and extension portion 24a.

In the composite rib 40 illustrated in FIG. 3, the first portion 42 has a surface 48 adjacent, and abutting, a surface 50 of the second portion 44. Each of the portions 42 and 44 have the same average height. The thickness, shape and size of the portions 42 and 44, as should also be understood with respect to the other embodiments, can vary as desired.

Referring to FIG. 4, a third embodiment of a trim panel 10b is shown. The third embodiment is similar to the second embodiment shown in FIG. 4. Accordingly, parts that are the same or similar will be given the same reference numeral with the suffix "b" attached. In this embodiment, the second portion 44b has an average height that is greater than the average height of the first portion 42b It should be understood that the relative heights could vary as desired. For instance, the first portion 42b could have a height that is greater than the second portion's height 44b.

Referring to FIG. 5, a fourth embodiment of a trim panel 10c is shown. The fourth embodiment is similar to the second embodiment shown in FIG. 4. Accordingly, parts that are the same or similar will be given the same reference numeral with the suffix "c" attached. In this embodiment, the composite rib 40c has a second portion 44c that circumscribes the first portion 42c such that the second portion 44c has an inner surface 54 that is adjacent to and abuts the outer surface 48c of the first portion 42c. In the embodiment illustrated in FIG. 5, the second portion 44c has a height that is less than the height of the first portion 42c. Varying the relative heights of the portions 42c and 44c can allow the energy management characteristics of the ribs 12 to be varied as desired.

Referring to FIG. 6, a fifth embodiment of a trim panel is shown. The fifth embodiment is similar to the second embodiment shown in FIG. 4. Accordingly, parts that are the same or similar will be given the same reference numeral with the suffix "d" attached. In this embodiment, the composite rib 40d has a first portion 42d surrounded by the softer second portion 44d. Each of the portions has a conical shape.

Referring to FIG. 7, a sixth embodiment of a trim panel 10e is shown. The sixth embodiment is similar to the second embodiment shown in FIG. 4. Accordingly, parts that are the same or similar will be given the same reference numeral with the suffix "e" attached. In this embodiment, the portions 42e and 44e have frustoconical shapes.

Referring to FIG. 8, a seventh embodiment of a trim panel 10f is shown. The seventh embodiment is similar to the second embodiment shown in FIG. 4. Accordingly, parts that are the same or similar will be given the same reference numeral with the suffix "f" attached. The composite rib 40f has the second portion 44f disposed within the first portion 42f.

FIG. 9 shows an eighth embodiment of a trim panel log. The eighth embodiment is similar to the second embodiment illustrated in FIGS. 1-2. Accordingly, parts that are the same or similar will be given the same reference numeral with the suffix "g" attached.

In the embodiment illustrated in FIG. 9, a relatively short and wide rib 12g is shown. In at least one embodiment the average thickness T of the rib 12g can be 0.8-3.0 t (with t being the average thickness of the substrate 14g), in another embodiment 0.85-2.5 t, and in yet another embodiment 1.0-2.5 t. As such, the average thickness T of the rib 12g can be 1.2-12.0 mm, in another embodiment 1.3-10 mm, and yet another embodiment 1.6-8.0 mm. In at least one embodiment, the average height H of the rib 12g can be 1-100 mm in yet other embodiments 5-35 mm, and in yet other embodiments 10-20 mm.

FIG. 10 shows a ninth embodiment of a trim panel 10h. The ninth embodiment is similar to the second embodiment shown in FIG. 4. Accordingly, parts that are the same or similar will be given the same reference numeral with the suffix "h" attached. The trim panel 10h is provided with rib 12h, made of the same material as skin 16h and extension portion 24h. The panel 10h is also provided with a rib 60 made of the same material as substrate 14h.

Figure 11:
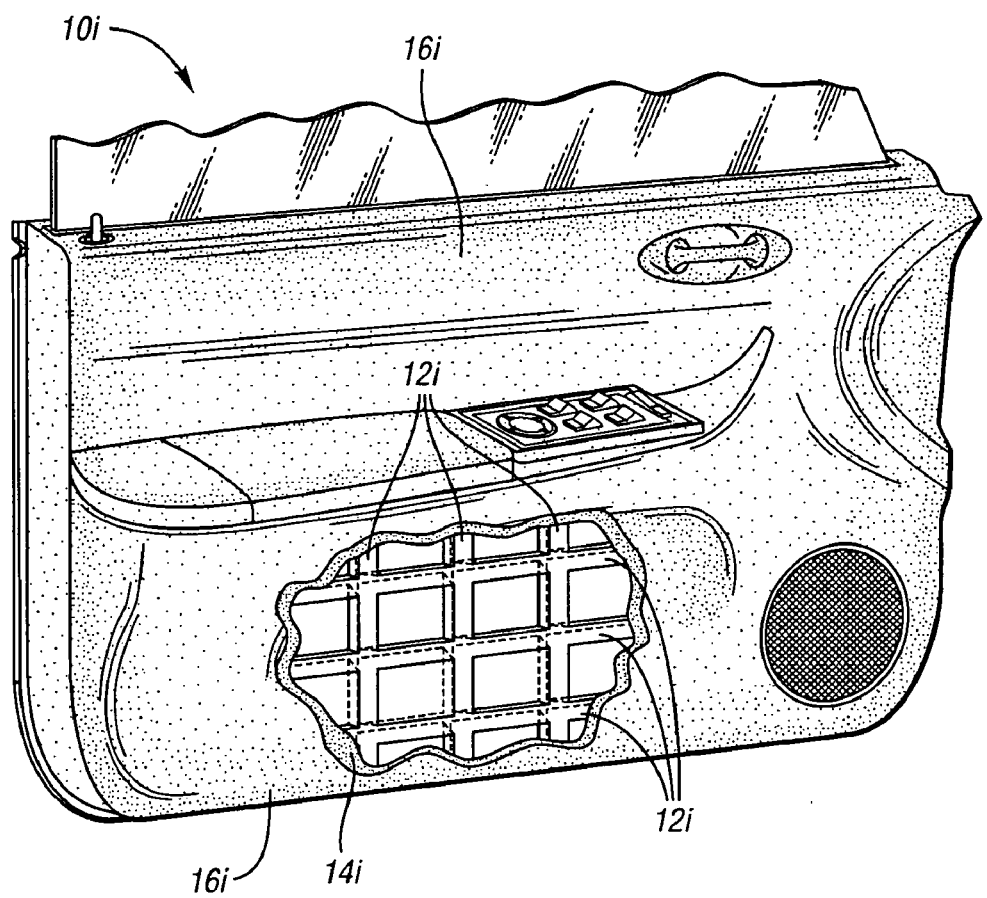
FIG. 11 sectional view of a trim panel assembly made in accordance with a tenth embodiment of the present invention.

FIG. 11 shows a tenth embodiment of a trim panel 10i. The tenth embodiment is similar to the second embodiment illustrated in FIGS. 1-2. Accordingly, parts that are the same or similar will be given the same reference numeral with the suffix "i" attached.

The ribs 12i are similar to ribs 12 but are longer. In at least one embodiment, the length of the ribs can be any length that would fit on the substrate 14i of the desired panel 10i, and can be between 0.1-150 cm, in another embodiment between 0.5-100 cm, and in yet another embodiment between 1.0-50 cm. The configuration also illustrates that both vertical and horizontal ribs 12c (in an egg carton-type layout) can be employed, however it should be readily understood that the ribs could extend in only one direction, or even other directions, or combinations of directions can be employed.

While embodiments of the invention have been illustrated and described, it is not intended that these embodiments illustrate and describe all possible forms of the invention. For instance, the sizes and shapes of the ribs can be varied and configured in different manner as desired to tailor the needs of the desired trim panel 10 in addition to the configurations shown herein. Furthermore, the extension portions 36 could extend about an edge of the substrate 14 rather than, or in addition to, extending through the substrate 14. Rather, the words used in the specification are words of description rather than limitation, and it is understood that various changes may be made without departing from the spirit and scope of the invention.

What is claimed is:

1. A trim panel assembly for a vehicle, said assembly comprising:
    a panel made of a first material, the panel having a first panel surface and a second panel surface;
    a skin covering at least a portion of the first panel surface of the panel, the skin being made of a second material less rigid then the first material; and
    a rib depending from the second panel surface away from the skin, the rib having at least a first portion being made of the second material, and a second portion made of the first material, wherein an extension portion extends between and connects the skin and the rib, the extension portion being made of the second material.

2. The assembly of claim 1 wherein a second rib extends from the back surface of the panel spaced from and separate from the first rib, the second rib being made of the first material.

3. The assembly of claim 1 wherein the trim panel assembly is made in a two-shot molding process, wherein the first material is injection molded in the first shot and then the second material is injection molded in the second shot after the first shot.

4. The trim assembly of claim 1 wherein the first portion of the rib covers at least a portion of the second portion of the rib.

5. The trim panel of claim 4 wherein the first portion of the rib extends around and covers only a portion of the second portion of the rib.

6. The trim panel of claim 4 wherein the first portion of the rib extends around and covers substantially all of the second portion of the rib.

7. The trim panel of claim 4 wherein the second portion of the rib extends around and covers only a portion of the first portion of the rib.

8. The trim panel of claim 4 wherein the second portion of the rib extends around and covers substantially all of the first portion of the rib.

9. The assembly of claim 1 wherein substantially all of the rib is made of the second material.

10. The assembly of claim 1 wherein the average base thickness of the rib is between 0.30 and 3.0 times the average thickness of the panel.

11. The trim panel assembly for a vehicle, said assembly comprising:
    a panel having a first surface and a second surface, the panel being made of a first material, the panel having an average thickness;
    a skin covering at least a first portion of the first surface of the panel, the skin being made of a second material being less rigid then the first material; and
    a rib depending from the second surface of the panel away from the skin, the rib having an average base thickness of at least 80% of the average thickness of the panel, the rib having at least a first portion being made of the second material, and a second portion made of the first material, wherein an extension portion extends between and connects the skin and the rib, the extension portion being made of the second material.

12. The assembly of claim 11 wherein the average base thickness of the rib is between 0.80 and 3.0 times the average thickness of the panel.

13. A method for manufacturing a trim panel assembly for a vehicle, said method comprising:
    providing an injection molded panel made of a first material, the panel having a first panel surface and a second panel surface;
    providing a skin covering at least a portion of the first panel surface of the panel, the skin being made of a second material less rigid then the first material; and
    providing a rib depending from the second panel surface away from the skin, the rib having at least a first portion being made of the second material, wherein the first portion of the rib and the skin are formed during the same injection molding process, the rib having at least a first portion being made of the second material, and a second portion made of the first material, wherein an extension portion extends between and connects the skin and the rib, the extension portion being made of the second material.

14. The method of claim 13 further comprising providing an extension portion made of the second material that extends between and connects the skin and the first portion of the rib.

15. The method of claim 13 wherein the step of providing the panel comprises providing a panel that includes a channel wherein the extension portion is to be provided.

16. The method of claim 13 wherein the step of providing a panel comprises injection molding the first material into an injection mold to form the panel.

17. The method of claim 13 wherein the steps of providing a skin and a rib comprises injection molding the second material into the injection mold after the panel has been formed.

18. The method of claim 13 wherein the average base thickness of the rib is between 0.80 and 3.0 times the average thickness of the panel.

19. The trim panel assembly of claim 1 wherein the first material comprises a relatively rigid plastic material and the second material comprises an elastomeric material.

20. The trim panel assembly of claim 11 wherein the first material comprises a relatively rigid plastic material and the second material comprises an elastomeric material.

* * * * *